US011663388B1

(12) United States Patent
Odabasi et al.

(10) Patent No.: US 11,663,388 B1
(45) Date of Patent: May 30, 2023

(54) DVD SIMULATION USING MICROCIRCUITS

(71) Applicant: ANSYS, INC., Canonsburg, PA (US)

(72) Inventors: Altan Odabasi, Austin, TX (US); Scott Johnson, Pflugerville, TX (US); Emrah Acar, Montvale, NJ (US); Joao Geada, Chelmsford, MA (US)

(73) Assignee: ANSYS, INC., Canonsburg, PA (US)

( * ) Notice: Subject to any disclaimer, the term of this patent is extended or adjusted under 35 U.S.C. 154(b) by 50 days.

(21) Appl. No.: 16/951,565

(22) Filed: Nov. 18, 2020

Related U.S. Application Data

(63) Continuation-in-part of application No. 16/723,852, filed on Dec. 20, 2019, now Pat. No. 11,531,794.

(60) Provisional application No. 62/705,899, filed on Jul. 21, 2020.

(51) Int. Cl.
*G06F 30/367* (2020.01)
*G06F 119/06* (2020.01)

(52) U.S. Cl.
CPC ........ *G06F 30/367* (2020.01); *G06F 2119/06* (2020.01)

(58) Field of Classification Search
USPC ........................................ 716/136
See application file for complete search history.

(56) References Cited

U.S. PATENT DOCUMENTS

| | | | |
|---|---|---|---|
| 5,535,134 A | 7/1996 | Cohn et al. | |
| 6,028,440 A | 2/2000 | Roethig et al. | |
| 6,721,929 B2 | 4/2004 | Li et al. | |
| 6,782,347 B2 | 8/2004 | Hirano et al. | |
| 6,938,233 B2 | 8/2005 | Satoh et al. | |
| 6,988,254 B2 | 1/2006 | Iwanishi et al. | |
| 7,103,863 B2 | 9/2006 | Riepe et al. | |
| 7,142,991 B2 | 11/2006 | Hathaway et al. | |
| 7,367,000 B2 | 4/2008 | Kurihara et al. | |
| 7,557,587 B2 | 7/2009 | Ogawa | |
| 7,752,578 B2 | 7/2010 | Allen et al. | |

(Continued)

OTHER PUBLICATIONS

Notice of Allowance from U.S. Appl. No. 16/723,852 dated Jan. 1, 2021, 9 pages.

(Continued)

*Primary Examiner* — Mohammed Alam
(74) *Attorney, Agent, or Firm* — Womble Bond Dickinson (US) LLP

(57) ABSTRACT

Methods, systems and media for simulating or analyzing voltage drops in a power distribution network can use an incremental approach to define a portion of a design around a victim to capture a sufficient collection of aggressors that cause appreciable voltage drop on the victim, and then an incremental simulation of just the portion can be performed rather than computing simulated voltage drops across the entire design. This approach can be both computationally efficient and can limit the size of the data used in simulating dynamic voltage drops in the power distribution network. Multiple different portions can be simulated separately in separate processing cores or elements. In one embodiment, a system can provide options of user selected constraints for the simulation to provide better accuracy or use less memory. Better accuracy will normally use a larger set of aggressors for each victim at the expense of using more memory.

16 Claims, 10 Drawing Sheets

(56) References Cited

U.S. PATENT DOCUMENTS

| | | |
|---|---|---|
| 7,865,850 B1 * | 1/2011 | Kao .................. G06F 30/39 716/136 |
| 7,900,166 B2 | 3/2011 | Kariat et al. |
| 8,001,508 B1 | 8/2011 | Daud et al. |
| 8,291,361 B2 | 10/2012 | Higashi |
| 8,327,305 B1 | 12/2012 | Hooi et al. |
| 8,327,306 B2 | 12/2012 | Oh et al. |
| 8,667,455 B1 | 3/2014 | Ho |
| 8,881,080 B2 | 11/2014 | Sajid et al. |
| 8,954,917 B1 | 2/2015 | Shu et al. |
| 10,289,141 B2 | 5/2019 | Lin et al. |
| 10,289,780 B1 | 5/2019 | Verma et al. |
| 10,482,210 B2 | 11/2019 | Wang et al. |
| 10,564,706 B2 | 2/2020 | Lin et al. |
| 10,585,996 B2 | 3/2020 | Chhabra |
| 10,671,784 B2 | 6/2020 | Wang et al. |
| 10,990,731 B1 * | 4/2021 | Odabasi .................. G06F 30/337 |
| 11,321,513 B1 * | 5/2022 | Geada .................. G06F 30/3312 |
| 11,531,794 B1 | 12/2022 | Odabasi et al. |
| 2001/0049815 A1 | 12/2001 | Shinomiya et al. |
| 2002/0065643 A1 * | 5/2002 | Hirano .................. G06F 30/367 703/19 |
| 2004/0031007 A1 | 2/2004 | Hirakimoto et al. |
| 2004/0031008 A1 | 2/2004 | Satoh et al. |
| 2004/0073878 A1 | 4/2004 | Hasegawa et al. |
| 2004/0098684 A1 | 5/2004 | Amekawa |
| 2008/0098335 A1 * | 4/2008 | Allen .................... G06F 30/367 716/120 |
| 2010/0064272 A1 | 3/2010 | Higashi |
| 2012/0026774 A1 | 2/2012 | Shionoiri |
| 2012/0125766 A1 | 5/2012 | Zhurin et al. |
| 2014/0181771 A1 | 6/2014 | Sajid et al. |
| 2016/0037595 A1 | 2/2016 | Yan et al. |
| 2017/0255732 A1 | 9/2017 | Milor et al. |
| 2019/0148284 A1 | 5/2019 | Aipperspach et al. |
| 2021/0224452 A1 | 7/2021 | Lin et al. |

OTHER PUBLICATIONS

Notice of Allowance from U.S. Appl. No. 16/723,852 dated Oct. 28, 2022, 16 pages.

Notice of Allowance from U.S. Appl. No. 16/723,852 dated Jul. 14, 2022, 9 pages.

Office Action from U.S. Appl. No. 16/723,852 dated Mar. 25, 2022, 18 pages.

Office Action from U.S. Appl. No. 16/723,852 dated Sep. 30, 2021, 21 pages.

Rodriguez, "Modelling and Simulation of the IR-Drop Phenomenon in Integrated Circuits," Univiesite Montpellier II—Sciences et Techniques du Languedoc, 2013, 162 pages. (Year: 2013).

* cited by examiner

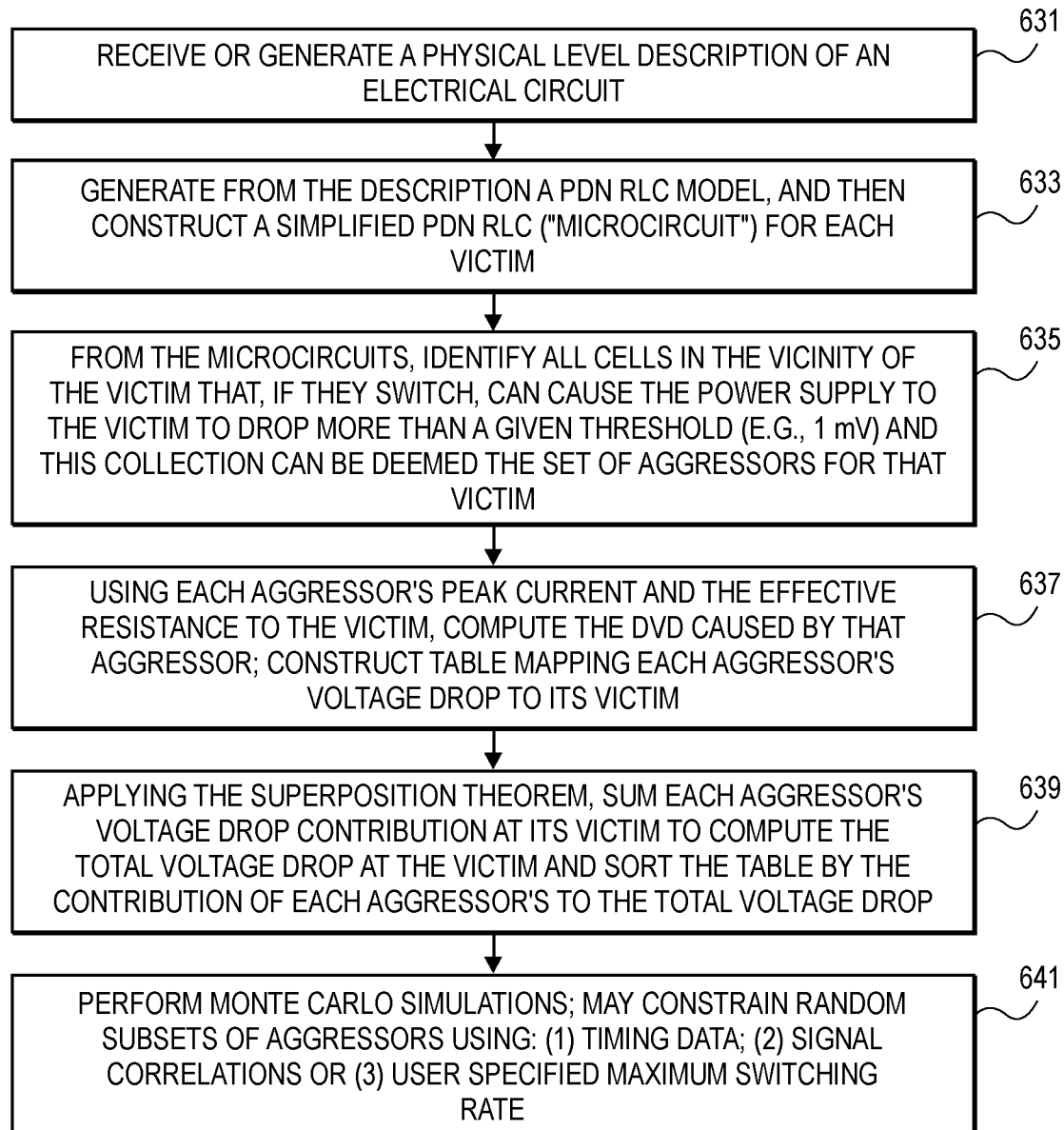

DVD SIMULATION USING MICROCIRCUITS

This application claims priority to and the benefit of U.S. provisional patent application No. 62/705,899, filed Jul. 21, 2020 and is hereby incorporated herein by reference. This application is a continuation in part of U.S. patent application Ser. No. 16/723,852, filed Dec. 20, 2019 which is incorporated herein by reference.

BACKGROUND

This disclosure relates to systems and methods for designing electrical circuits such as integrated circuits. In particular, the disclosure relates to computer aided design and computer aided engineering which can use simulations, such as dynamic voltage drop simulations, of a design to test how well the design will work.

Dynamic voltage drop analysis is often done to simulate how a power grid or power distribution network in an integrated circuit will perform when data signals switch or toggle between voltage states, such as from high to low states, etc. Often, this switching can cause circuits to consume more power than when the circuit is idle (and therefore there is little switching). This increased power consumption can cause the power grid to deliver less than desired levels of voltage at one or more nodes or pins in the circuit, and this lowered level of voltage can affect the operation of logic circuits to the extent that the logic circuits may not operate correctly or as desired. Thus, circuit designers often use simulation software to perform dynamic voltage drop analysis before they finish the design of an electrical circuit. Dynamic voltage drop analysis typically involves simulating the repeated change over time of various data signals over the entire electrical circuit so that over time different data signals are repeatedly toggled to different voltage states to simulate normal operation of the entire circuit (in which it is expected that the various data signals will change over time due to the normal operation of the entire circuit). When performing dynamic voltage drop analysis, signals that are to be toggled (in a sequence of switching activities) are identified in a vector that can either be user provided or automatically constructed through a random approach which is often referred to as a vectorless approach but in both cases (user provided or automatically constructed) this sequence of switching activities requires considerable computational resources to simuate the entire circuit. A purely random selection of signals is used in this vectorless approach which can be fast and easy and provide a reasonable representation for full system power but is still performed over the entire circuit. Thus, these prior approaches are not computationally efficient.

Existing dynamic voltage drop simulations perform the voltage drop analysis across the entire integrated circuit (IC), and thus these simulations must be repeated for the entire IC when just a portion of the design has changed and thus any changes in the design will increase the time required to complete the design process by requiring a full dynamic voltage drop simulation again after the change.

SUMMARY OF THE DESCRIPTION

Methods, systems and media for simulating or analyzing voltage drops in a power distribution network can use an incremental approach to define a portion of a design around a victim to capture a sufficient collection of aggressors that cause appreciable voltage drop on the victim, and then an incremental simulation of just the portion can be performed rather than computing simulated voltage drops across the entire design. This approach can be both computationally efficient and can limit the size of the data used in simulating dynamic voltage drops in the power distribution network. Multiple different portions can be simulated separately in separate processing cores or elements. In one embodiment, a system can provide options of user selected constraints for the simulation to provide better accuracy or use less memory. Better accuracy will normally use a larger set of aggressors for each victim at the expense of using more memory.

According to one aspect that is described herein, a method for performing one or more simulations can include the following operations: receiving one or more inputs that specify a selected set of victims in a design of an electrical circuit; determining a corresponding set of aggressors for each victim based on the selected set of victims; and performing an incremental dynamic voltage drop simulation for each victim in the set of victims based on the determined set of aggressors. In one embodiment, the incremental voltage drop simulation is limited to a portion of the design that includes the selected set of victims and the corresponding set of aggressors, and wherein each corresponding set of aggressors represent a set of instances in a design that cause a voltage drop on a power supply node of the victim of the corresponding set of aggressors when they switch states. In one embodiment, the incremental voltage drop simulation computes a set of vector multiply and accumulate operations limited to the selected set of aggressors around the corresponding victim without computing vector multiply and accumulate operations for instances not included in the selected set of aggressors and wherein the incremental voltage drop simulation seeks to determine effects on a power grid from an incremental change in the design. In one embodiment, each set of vector multiply and accumulate operations is performed on a separate processing core. In one embodiment, wherein the set of vector multiply and accumulate operations are performed concurrently in time. In one embodiment, the set of vector multiple and accumulate operations for one victim and another set of vector multiple and accumulate operations for another victim are independent operations that do not depend on each other.

In one embodiment, the method according to this aspect can include the following additional operations: determining whether the determined corresponding set of aggressors for each victim captures a sufficient set of aggressors that cause a voltage drop at the power supply node of the corresponding victim; and enlarging a first region containing a first set of aggressors to create a second region containing a second set of aggressors in response to determining the first region does not capture a sufficient set of aggressors, the second region being a portion of the design and encompassing the first set of aggressors. In one embodiment, a sufficient set of aggressors is captured when voltage drops at the corresponding victim caused by logic elements at a periphery converge to values less than a predetermined electrical value which can be one of a voltage value or a current value.

In one embodiment, the method according to this aspect can include the following additional operation: receiving one or more user selected constraints associated with the selected set of victims, wherein the one or more user selected constraints comprise one of: (a) an accuracy constraint that specifies a level of desired accuracy in the incremental dynamic voltage drop simulation or (b) a memory constraint that limits computations based on an amount of available memory in the data processing system.

According to another aspect that is described herein, a method for performing one or more simulations can include the following operations: receiving one or more inputs that specify a selected set of victims in a design of an electrical circuit; receiving one or more user selected constraints associated with the selected set of victims; determining a corresponding set of aggressors for each victim based on the selected set of victims and the user selected constraints; and performing a dynamic voltage drop simulation for each victim in the set of victims based on the determined set of aggressors and the user selected constraints. In one embodiment, the dynamic voltage drop simulation is an incremental voltage drop simulation, and the one or more user selected constraints comprise one of: (a) an accuracy constraint that specifies a level of desired accuracy in the incremental dynamic voltage drop simulation or (b) a memory constraint that limits computations based on an amount of available memory in the data processing system. In one embodiment, wherein a high level of accuracy in a specified user selected constraint causes a larger set of aggressors than a low level of accuracy in the specified user selected constraint. In one embodiment, the high level of accuracy will use more memory in the data processing system during the DVD simulation than the low level of accuracy. In one embodiment, the incremental voltage drop simulation is limited to a portion of the design that includes the selected set of victims and the corresponding set of aggressors, and wherein each corresponding set of aggressors represent a set of instances in a design that cause a voltage drop on a power supply node of the victim of the corresponding set of aggressors when they switch states. In one embodiment, the incremental voltage drop simulation can compute a set of vector multiply and accumulate operations limited to the selected set of aggressors around the corresponding victim without computing vector multiply and accumulate operations for instances not included in the selected set of aggressors and wherein the incremental voltage drop simulation seeks to determine effects on a power grid from an incremental change in the design.

The aspects and embodiments described herein can include non-transitory machine readable media that can store executable computer program instructions that when executed cause one or more data processing systems to perform the methods described herein when the computer program instructions are executed. The instructions can be stored in non-transitory machine readable media such as in dynamic random access memory (DRAM) which is volatile memory or in nonvolatile memory, such as flash memory or other forms of memory. The aspects and embodiments described herein can also be in the form of data processing systems that are built or programmed to perform these methods. For example, a data processing system can be built with hardware logic to perform these methods or can be programmed with a computer program to perform these methods.

The above summary does not include an exhaustive list of all embodiments are aspects in this disclosure. All systems, media, and methods can be practiced from all suitable combinations of the various aspects and embodiments summarized above and also those disclosed in the detailed description below.

BRIEF DESCRIPTION OF THE DRAWINGS

The present invention is illustrated by way of example and not limitation in the figures of the accompanying drawings in which like references indicate similar elements.

FIG. 1B shows a slice of the various layers in an integrated circuit which includes the power delivery network, where these layers include metal conductors on the top of each layer as well as conductive vias that provide connections through each layer.

FIG. 5B is a flowchart which illustrates a method which can use such a data structure and one or more microcircuits described herein to derive distributions of voltage drops for a victim.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

This disclosure is related to a prior filed US patent application that describes the construction and use of one or more local microcircuits in DVD simulations; that prior filed U.S. patent application Ser. No. 16/723,852, filed Dec. 20, 2019 by Applicant ANSYS, Inc. of Canonsburg, Pa. and that prior filed US patent application is hereby incorporated herein by reference. This application is a continuation-in-part of U.S. patent application Ser. No. 16/723,852, filed Dec. 20, 2019. A microcircuit can be generated around a selected victim and then used in one or more DVD simulations as described in that prior patent application.

The relevant embodiments of this disclosure include the embodiments shown in FIGS. 6A, 6B, 7A, and 7B and described in conjunction with these figures. These embodiments relate to incremental simulations and also to the use of user specified constraints relating to accuracy or memory usage or both accuracy and memory usage. Prior to describing these embodiments, useful information about microcircuits will be provided in the following section while referring to FIGS. 1A, 1B, 1C, 1D, 2A, 2B, 3A, 3B, 4A, 4B, 5A and 5B.

Figure 1A:
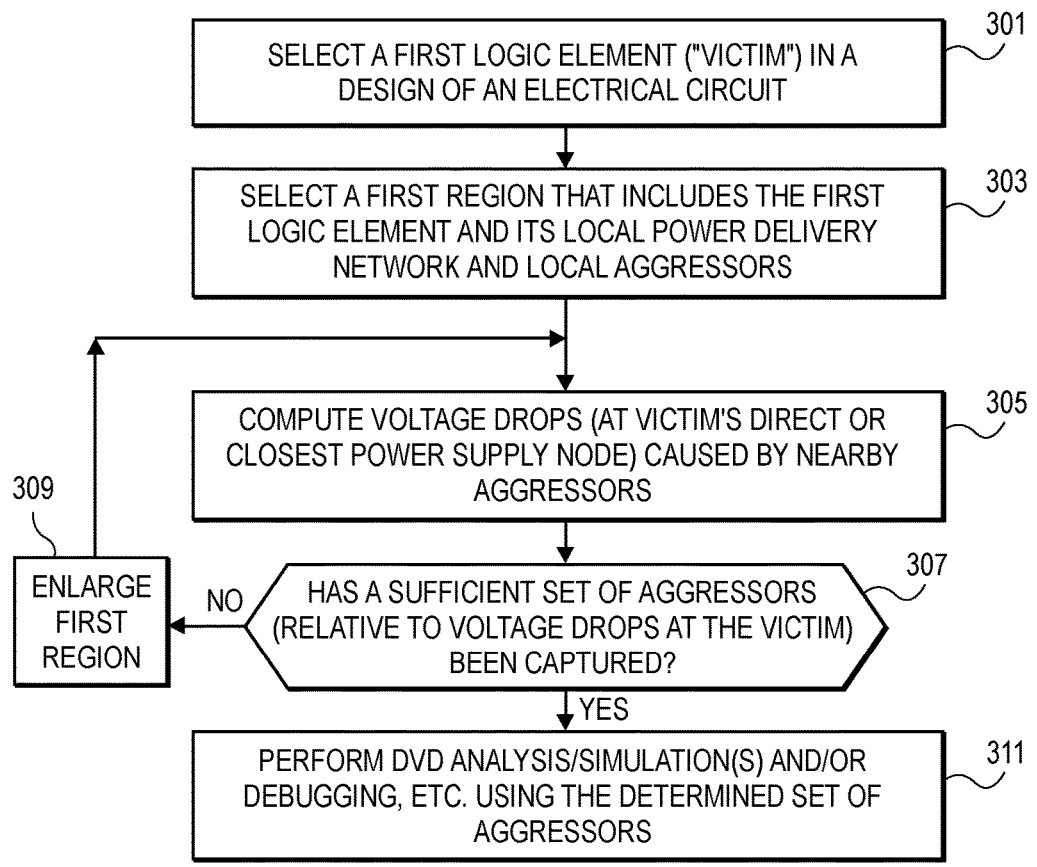
FIG. 1A shows a flowchart which illustrates a method according to an aspect which can use a microcircuit.

An aspect of this disclosure relates to methods for creating one or more portions (each of which can be referred to as a microcircuit) of a design around the victim (or power supply pin of the victim) and using these portions to capture a sufficient, but limited, number of possible aggressors of the victim that cause appreciable voltage drop on the victim. These portions can be referred to as microcircuits. These methods can provide computationally efficient approaches to dynamic voltage drop simulations or analyses and yet still be accurate. Each of these portions can be started at a predetermined size and then enlarged in an iterative process until the method determines that a sufficient set of aggressors that can cause appreciable voltage drop on the victim have been captured in the method. The power delivery network or power grid of the design can be considered as a mesh of resistive (R), inductive (L), and capacitive (C) elements, and with current fabrication processing at very small geometries, the resistance of conductors can be large at lower levels of metallization, and it is these lower levels of metal in the integrated circuit that connect to the individual cell instances such as logic elements in the design. The top layers of metal are much wider and thicker and have much lower resistivity than the lower levels of metallization. The various layers of the power delivery network or power grid are interconnected by vertical connectors which are known as vias. Due to this mesh structure, the current drawn by any particular cell will primarily be supplied by the parts of the grid or power delivery network that are physically close by, with this supplied current across each element of the grid rapidly vanishing as we get further from the point of current demand. Therefore, to get an accurate enough simulation of the ability of the power grid or power delivery network to supply power to an instance (for example a victim), one approach can be to simulate a limited area of the RC mesh of the power delivery network that is local to that particular instance. This limited area also automatically defines the number of instances (for example, a set of aggressors) whose switching activity could have a measurable impact on the supply seen by the victim. Moreover, due to the symmetry in the circuit, the demand an instance places on the power delivery network is also the perturbation that instance causes on the supply seen by all of its neighbors. As the power delivery network is passive (RLC only, no active elements), one or more of the methods described herein can use the superposition theorem to sum the perturbations caused by each instance in the neighborhood of a victim to compute the total effect upon the victim from various permutations of switching activity of its neighbors. This can be done efficiently as it is purely a linear computation process in the number of aggressors. FIG. 1A shows an example of a method which can use one or more portions or regions of a design when preparing to perform all DVD simulations or analysis.

Figure 1B:
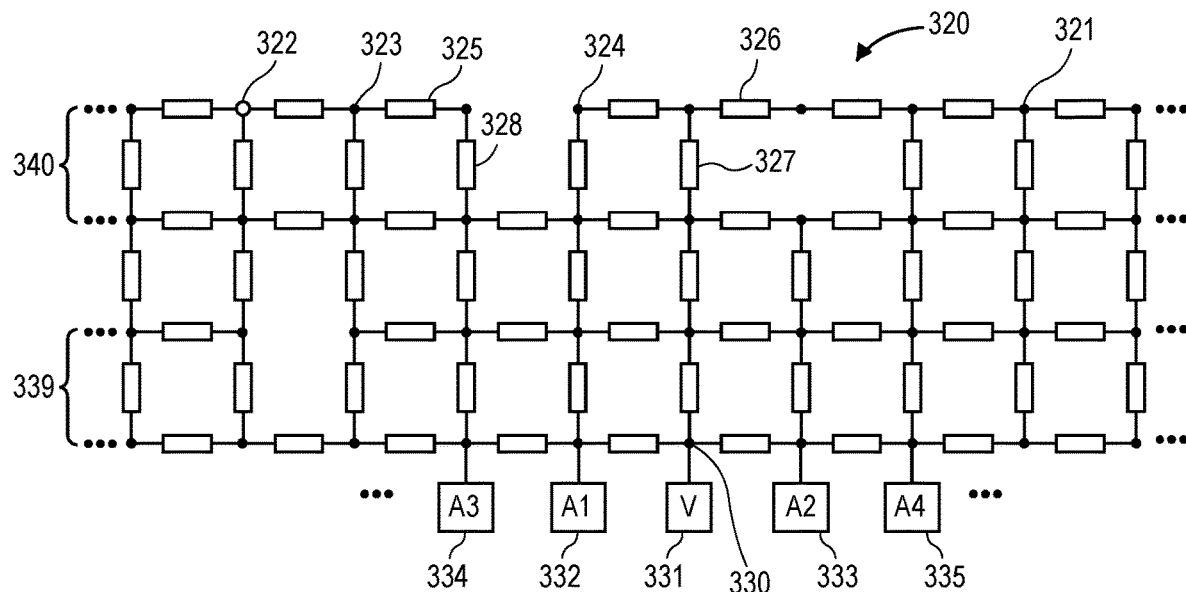
FIG. 1B shows an example of a power delivery network.
Figure 1C:
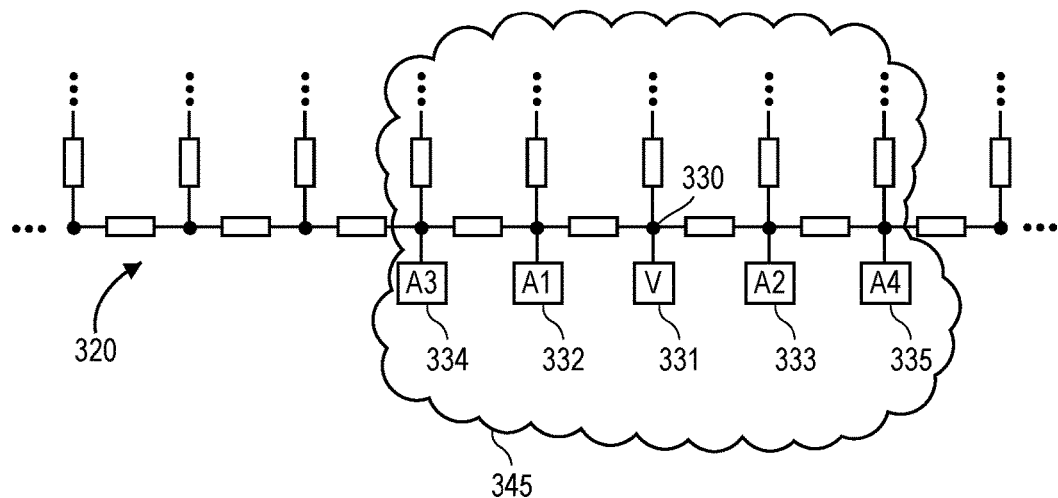
FIG. 1C shows an example of a first region which is selected according to one method described herein.
Figure 1D:
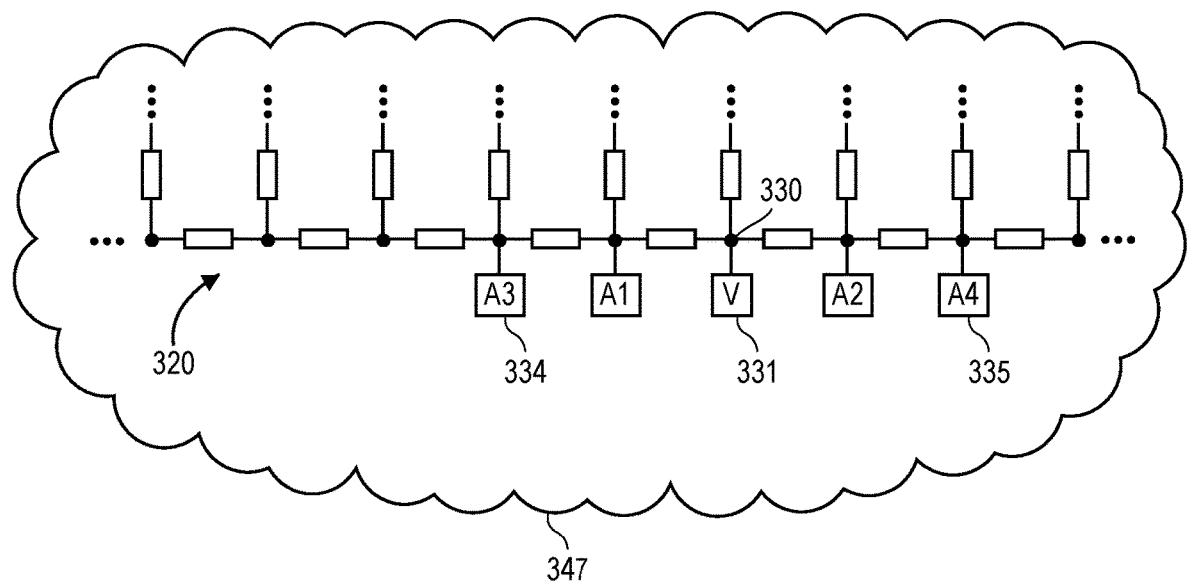
FIG. 1D shows an enlarged first region after it has been determined that a sufficient set of aggressors has not yet been captured in the method.
Figure 2A:
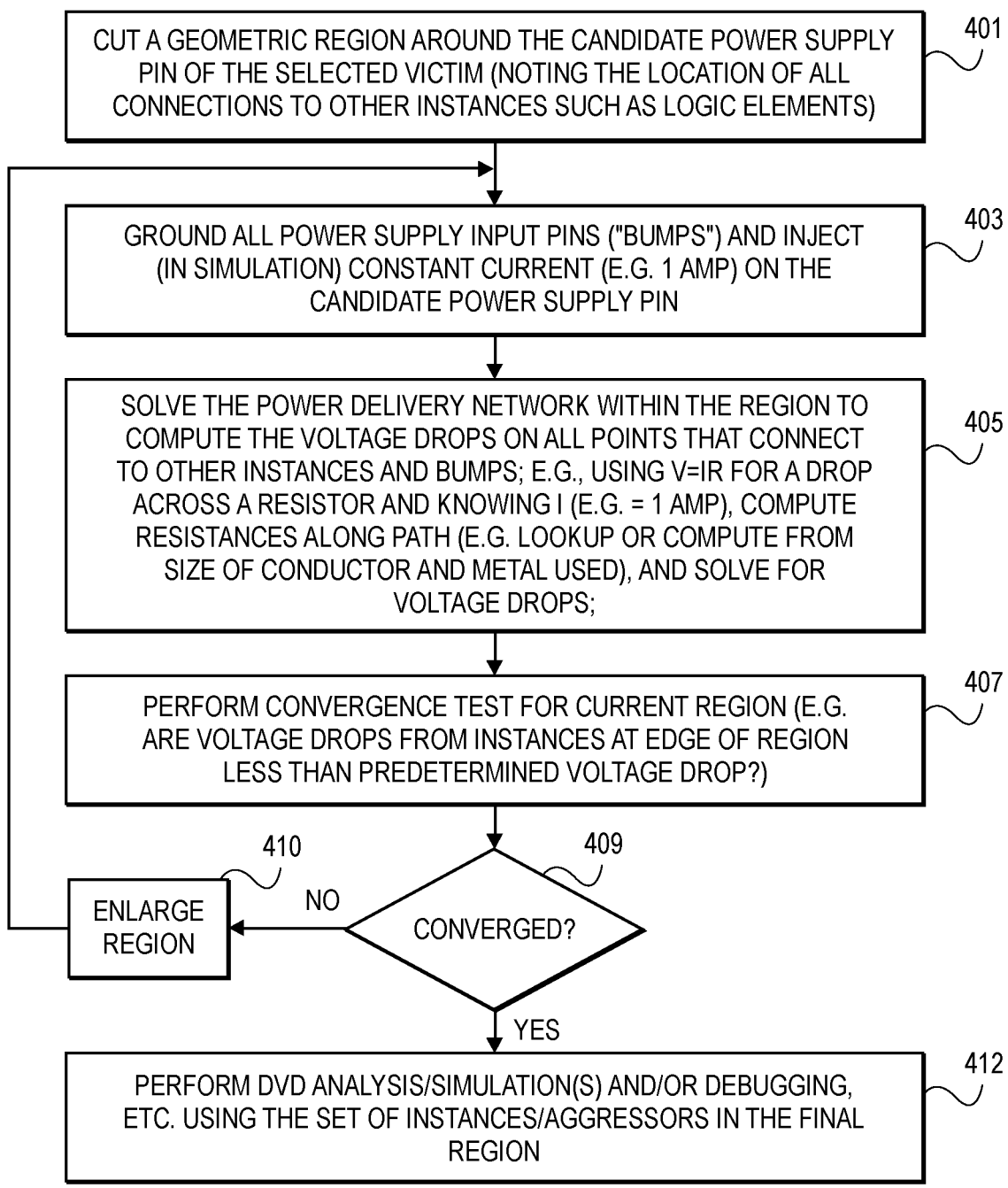
FIG. 2A is a flowchart which illustrates a method according to the aspect in which a microcircuit is used to generate one or more simplified models for a power distribution network.

The method shown in FIG. 1A can begin in operation 301, and in that operation 301, the user or the system can select a first logic element in a design of an electrical circuit, where the first logic element can be a victim or cell that is considered a victim. For example, a user may recognize that a particular logic element in a portion of the design may be prone to race conditions or other timing problems which can be exacerbated by noise on the power distribution network that is caused by switching of aggressor components that are near to the particular logic element. Thus the user may recognize that the particular logic element should be treated as a victim and analyzed using simulations of dynamic voltage drop to determine whether there is too much noise on the power distribution network which could prevent the victim from operating properly. Alternatively, the system may select the victim in a particular region based upon geometry or topology information which is available to circuit simulation software in many cases. In operation 303, the user or the system can select a first region, which can be referred to as a microcircuit, that includes the first logic element and also includes its local power delivery network (e.g., power delivery network 320 shown in FIG. 1B) and local aggressors, but the first region does not include the entire design and is only a portion of the entire design. Examples of a first region will be described below in conjunction with FIG. 1C. Then in operation 305, shown in FIG. 1A, the system can compute the voltage drops at the victim's direct power supply node (or closest power supply node) caused by nearby aggressors in the selected region (but ignoring and not computing voltage drops from aggressors outside of the selected region). In the example shown in FIG. 1C, the victim 331 is within a first region 345, and aggressors 332, 333, 334, and 335 are also within the first region 345, and these aggressors can cause a voltage drop on the pin 330 when the aggressors switch between voltage states during their normal operation. In one embodiment, operation 305 can compute voltage drops using information about the conductors in the power delivery network such as the type of metal, the thickness and width of the metal, etc. This information can be used, as is known in the art, to compute resistances along the connection paths within the power delivery network. The method shown in FIG. 2A provides more information about how the voltage drops can be computed in one embodiment using a simulated constant current of a known value. After the voltage drops have been computed in operation 305, the system can then determine in operation 307 whether or not a sufficient set of aggressors have been captured for purposes of dynamic voltage drop simulations or analyses. If a sufficient set of aggressors has been captured, then processing can proceed to operation 311. In operation 311, the system can perform one or more simulations or analyses, such as DVD simulations or analyses and/or debugging, etc. using the determined set of aggressors. These simulations or analyses can use the other aspects described herein, such as the use of identified groups to constrain random toggling or the use of Monte Carlo simulations, etc. If, on the other hand, operation 307 determines that a sufficient set of aggressors has not been captured, then processing proceeds to operation 309 in which the first region is enlarged to capture an enlarged set of aggressors which can then be further processed in operation 305 after the first region has been enlarged as shown in FIG. 1A. In one embodiment, the first region can be iteratively enlarged over time until a sufficient set of aggressors have been captured. FIG. 1D shows an example of an enlarged first region 347 which is enlarged from the first region 345 shown in FIG. 1C as a result of operation 307 determining that an insufficient set of aggressors have been captured in the method shown in FIG. 1A. Further information about determining whether or not the set of aggressors is sufficient is provided below in conjunction with the method shown in FIG. 2A.

The method shown in FIG. 1A can be used to create a reduced model of a power delivery network and in particular a reduced RLC model for the power delivery network when determining sets of aggressors for each selected victim. Each reduced RLC model can be referred to as a microcircuit which can be used in operation 311 shown in FIG. 1A or operation 412 shown in FIG. 2A. FIG. 1B shows an example of a power delivery network (PDN) 320. In the example of FIG. 1B, three layers are shown but it will be understood that the design, in the form of an integrated circuit, can have many more layers which include a top layer and a bottom layer, such as top layer 340 and bottom layer 339. The bottom layer 339 is next to the logic elements such as inverters, buffers, and other active elements that include transistors to perform logic operations or to control or generate signals in the design. For example, the logic elements can include a victim 331 which is coupled to receive power through a pin 330. The logic elements can also include aggressors 332, 333, 334, and 335 (as well as other aggressors not shown on both the left and right side of the PDN 320). Each of these aggressors can be logic elements that can switch between voltage states and therefore cause voltage drops on the pin 330 when the aggressors switch. The rectangles in the power delivery network 320 represent connection resistances or resistors such as connection resistance 325 and connection resistance 326. The connection resistances are due to the inherent resistance in a conductor. The power delivery network 320 also includes vias that also provide resistance or a connection resistance, such as via 328 and via 327. The pins, such as pins 323 and 324, represent connections from one layer to a layer below through the vias. The connection to a power supply is through one or more nodes on the top layer, such as power supply node 322 and power supply node 321 which can be referred to as "bumps". It is these nodes that provide power into the power delivery network, and these nodes are remote from the logic elements (such as victim 331 and aggressors 332, 333, etc.) that are below the bottom layer.

The method shown in FIG. 2A shows another embodiment which can be used to construct and use one or more microcircuits for the purpose of performing DVD simulation or analysis or debugging of a power distribution network. In operation 401, the system or the user can form or cut a geometric region around a candidate power supply pin of the selected victim. In the example shown in FIG. 1C, the candidate power supply pin of the selected victim is the pin 330 which provides power directly to the victim 331. In operation 401 the system can note the location of all connections to other instances, such as neighboring logic elements which in the example shown in FIG. 1C includes aggressors 332, 333, 334, and 335. The geometric region can be cut in a variety of shapes; for example, the cut or geometric region can be a rectangular shape or other polygons, and these polygons can resemble an impact zone which is determined using the method shown in FIG. 2A. It will be understood that the cut of the geometric region is performed in one embodiment in software which has simulated the design at a physical level, and the operations in FIG. 2A can also be done in the same software when it calculates voltage drops and performs convergence tests and later also performs one or more DVD simulations or analyses and/or debugging. In operation 403, the method can ground all power supply input pins ("bumps") and inject (in the simulation) a constant current of a known value, such as one (1) amp, on the candidate supply pin. This allows the method in operation 405 to solve for the voltage drops within the geometric region that was cut in the power delivery network. In one embodiment, the operation 405 can be a resistive solve which computes the voltage drops by computing the resistances in the connection resistances of the power delivery network around the selected victim and the aggressors in the geometric region formed by the cut in operation 401. The resistances of the connection resistances can be computed through a query or lookup operation on a full design parasitic extraction database or data structure that includes information about the design of the electrical circuit. The voltage drop, V=IR, can be computed along the paths in the power delivery network using the known injected current (I) and the computed resistances (R). Thus, operation 405 can compute the voltage drops on all points that connect to the other instances (aggressors) and bumps and thereby determine a table which can be used (as described further below) during the analysis or simulations in, for example, operation 412. In one embodiment, the set of aggressors that produce voltage drops at the victim that are greater than a predetermined voltage drop (e.g. 10 mV) are considered to be within an impact zone in that these aggressors have an appreciable impact on the selected victim. The superposition theorem can be used to sum the voltage drops caused by each aggressor in the neighborhood of the victim to compute the total effect upon the victim. Then operation 407 can be performed to determine whether or not the current region has captured a sufficient set of aggressors. For example, operation 407 can perform a convergence test for the current region by examining the periphery of the region to determine whether, for example, voltage drops (at the victim) from aggressors at the edge of the region are less than a predetermined voltage drop. If operation 409 determines that the region has converged to an adequate solution then processing proceeds to operation 412. On the other hand, if the solution has not converged as determined in operation 409, then the current region is enlarged in operation 410 and processing reverts back to operation 403 as shown in FIG. 2A. FIG. 1D shows an example of how the prior region is enlarged to create an enlarged region which is then used in further processing in operation 403. FIG. 3B shows an example of how the region can be enlarged in an alternative embodiment in which the region is enlarged asymmetrically. Operations 407 and 409 can perform the convergence testing at the edge of the current region or the periphery (e.g. perimeter 455 in FIG. 3A) of the current region by examining voltages and/or currents at the edge or periphery to determine whether or not a sufficient set of aggressors has been captured by the current region. In one embodiment, convergence can be determined by observing the voltages in the impact zone (e.g., at the periphery of the impact zone) have not changed appreciably between growth iterations. Any change less than a predetermined voltage can be considered a small enough change that shows that convergence has been established and the region does not need to be grown any larger. Alternatively, if the sum of currents at the edge of the region is smaller than a predetermined precision threshold, the construction of the region can be considered converged and thus the region does not need to be grown any larger. After it is determined that the microcircuit has properly converged to an adequate solution for the set of aggressors for a particular region or microcircuit, operation 412 can be used to perform one or more DVD simulations or analyses and/or debugging, etc. using the set of aggressors from the final region or microcircuit.

Figure 3A:
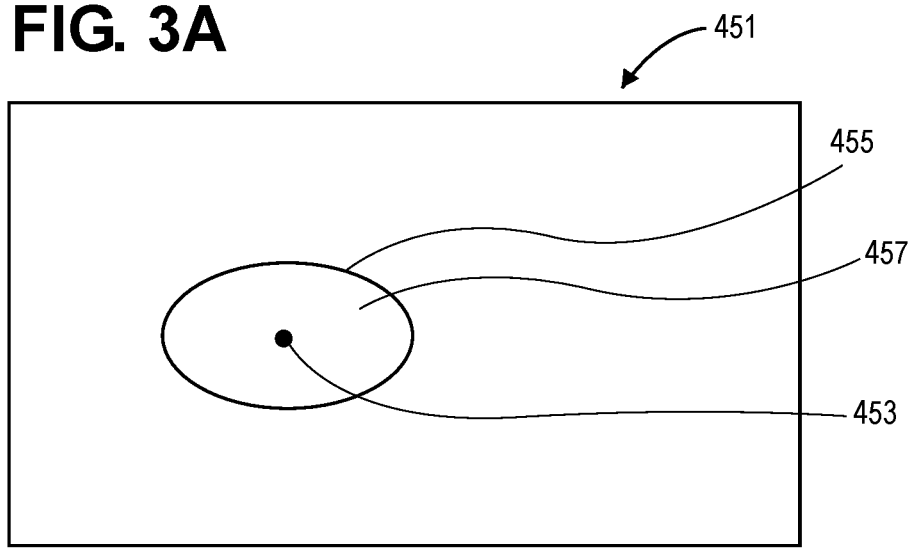
FIG. 3A shows an example of an impact zone which can be derived using the one or more methods according to an aspect which uses one or more microcircuits.
Figure 3B:
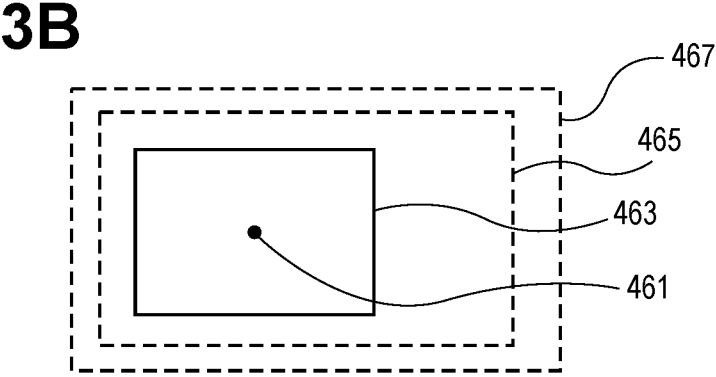
FIG. 3B shows an example of the geometry of a region and how the region can grow over time using a method according to an aspect that employs one or more microcircuits.

FIG. 3A shows an example of an impact zone 457 which surrounds a victim 453, and the perimeter or edge of the impact zone is defined by the perimeter 455. It is the perimeter 455 that is used in one embodiment in the convergence test of operation 407 to determine whether or not the solution has converged in operation 409. The victim 453 and the aggressors contained in the impact zone 457 are all logic elements in the integrated circuit 451 shown in FIG. 3A. As shown in FIG. 3B, the initial region can be grown asymmetrically in one embodiment. The direction and extent of the growth in each direction can be based upon the convergence testing, such as convergence testing in operation 407 and 409 in FIG. 2A and operation 307 shown in FIG. 1A. For example, peripheral areas that have voltage drops that are much further from convergence (in that they are much higher than a predetermined voltage drop used in the convergence testing) can be enlarged more than peripheral areas that are closer to convergence (in that they have much smaller voltage drops that are just above, near or below the predetermined voltage drop used in the convergence testing). In the example shown in FIG. 3B, the first region 463 which surrounds the victim 461 is grown asymmetrically in two iterations which include a first enlarged region 465 which is followed by a second enlarged region 467. The direction of growth is mostly to the right side as shown in FIG. 3B and there is much smaller growth towards the left side as shown in FIG. 3B. In the example shown in FIG. 3B, the region or cut is a rectangular region but it will be appreciated that other types of polygons can be used for the region or cut and those other types of polygons can also utilize asymmetric growth as described herein. The asymmetric growth may accelerate the convergence process. In certain embodiments, soft grounding of the bumps or power supply pins, such as power supply nodes 321 and 322 shown in FIG. 1B, can be used to accelerate the convergence process. A soft grounding is a grounding of a pin through a resistor rather than directly to ground.

Figure 2B:
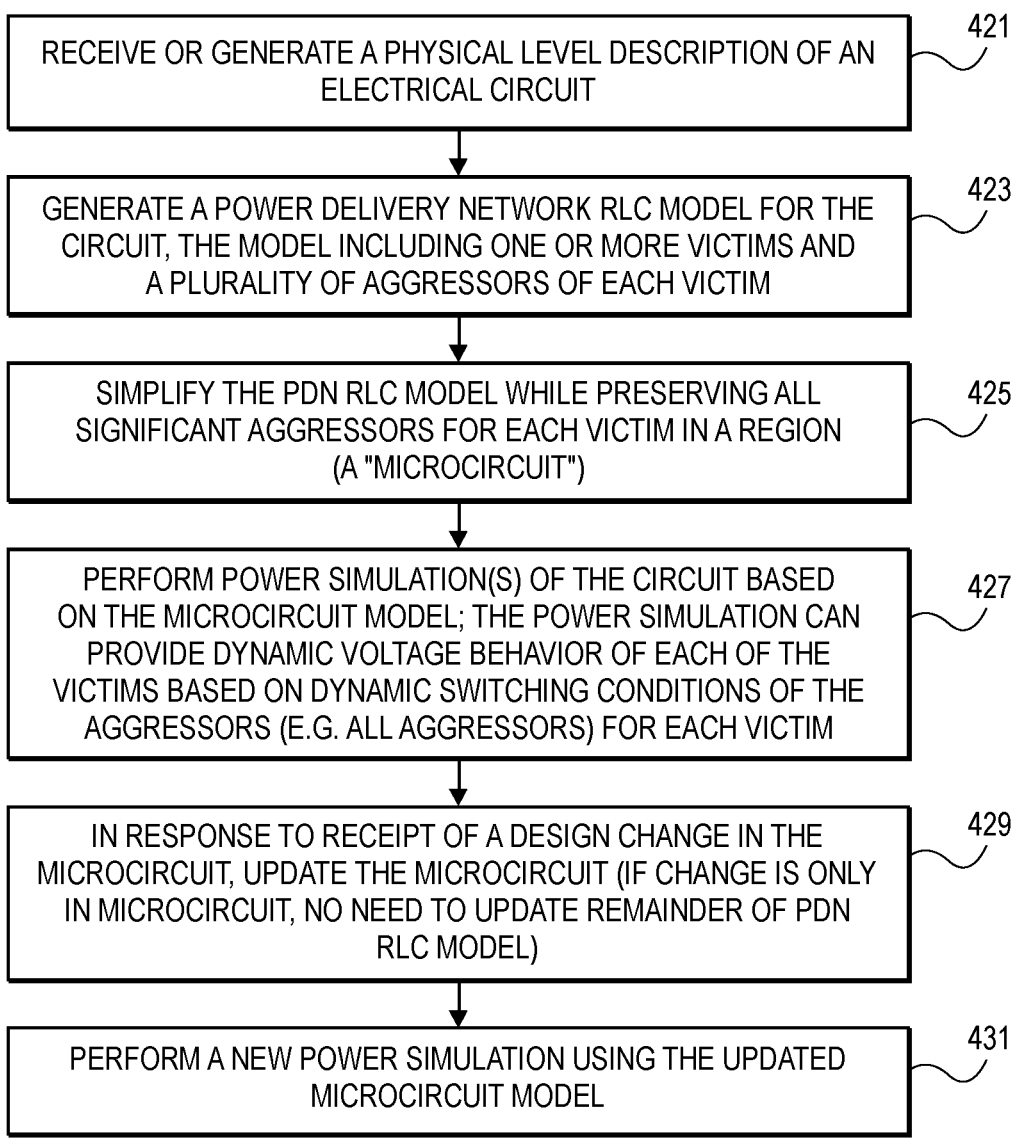
FIG. 2B shows a flowchart which illustrates a method which can be performed according to one embodiment that uses a microcircuit.

FIG. 2B shows a general, overall example of an embodiment which can use one or more microcircuits constructed using, for example, the method shown in FIG. 1A or the method shown in FIG. 2A. In operation 421, the system can receive or generate a physical level description of an electrical circuit. This physical level description can include information about the conductors in a power delivery network of the design of the electrical circuit which can be used to derive the connection resistances. In operation 423, the system can generate a power delivery network RLC model for the electrical circuit, and the model can include one or more victims and a plurality of aggressors for each victim. Then in operation 425, the power delivery network RLC model can be simplified while preserving all significant aggressors for each victim in a region, such as a microcircuit. The simplification in operation 425 can use the methods shown in either FIG. 1A or 2A to generate the region or microcircuit and then optimize the size of the region or microcircuit to ensure that a sufficient set of aggressors have been captured relative to each victim in the region or microcircuit. In one embodiment, the region or microcircuit can include a plurality of victims, and each of the victims can be associated with information about their corresponding set of aggressors and the voltage drops associated with those corresponding set of aggressors. In operation 427, the system can perform one or more power simulations of the circuit based on the microcircuit model. For example, the power simulation can provide dynamic voltage behavior of each of the victims based on dynamic switching conditions of the aggressors, such as all aggressors for each victim within only the region or microcircuit. This analysis or simulation can indicate to the designer that there is a need to change the design within the microcircuit. Thus the designer can change either logic elements within the microcircuit or the power delivery network within the microcircuit (or both). In operation 429, the system can receive the change in design within the microcircuit and update the microcircuit only with respect to the power distribution network RLC model for that updated microcircuit which can be then used in further simulations. Operation 429 allows the designer to update just a portion of the design without requiring the entire design to be updated and thus new simulations can be performed after only a portion of the design has been updated within the microcircuit model. This is shown as operation 431.

Figure 4A:
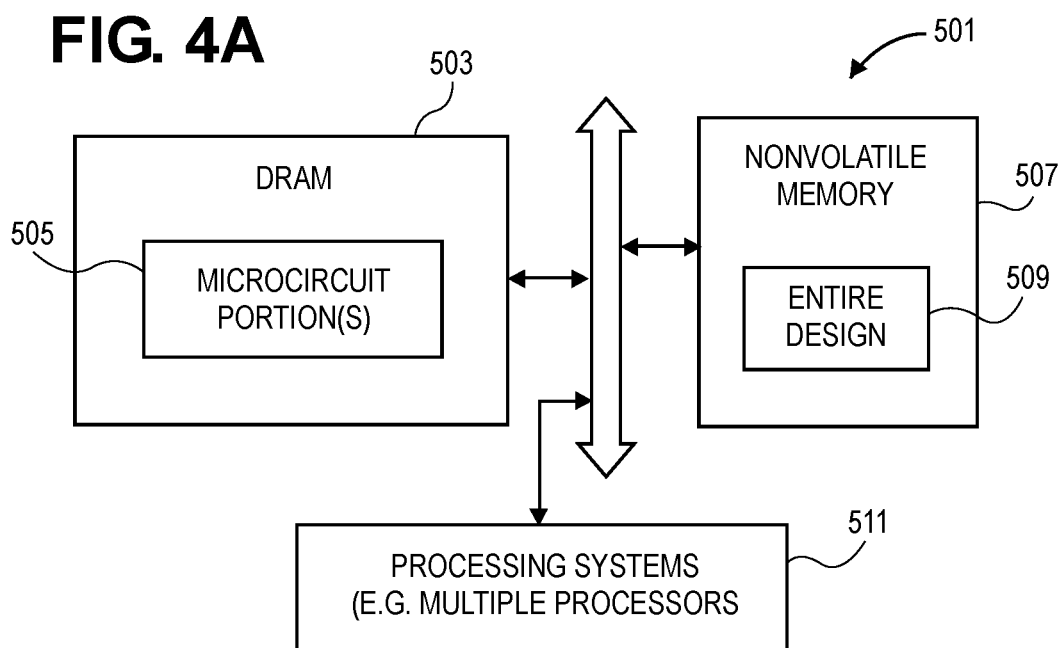
FIG. 4A shows an example of a data processing system which can be configured to perform one or more methods that use microcircuits.

There are several optimizations which can be used in conjunction with the construction and use of microcircuits. For example, during the creation or construction of the microcircuits and in some cases during the simulations, such as dynamic voltage drop simulations, of the microcircuits, it is possible to perform the creation or construction or simulations or other operations on just the microcircuit portions rather than the entire design. This enables a data processing system to load data about just the portions into main or working memory, such as DRAM memory while maintaining data about the entire design in nonvolatile memory, such as a hard drive memory or flash memory, etc. This optimization is shown in FIG. 4A. The data processing system 501 includes all DRAM 503 which stores just a portion of the design which is the portion relating to the microcircuits, and is shown as one or more microcircuit portions 505. These one or more microcircuit portions 505 provide data about only the microcircuit portions which are being analyzed or simulated while the remainder of the design remain stored in nonvolatile memory 507 and is shown as entire design 509. A processing system, such as multiple processors 511 can access the data in main or working memory (e.g. DRAM 503) and perform the construction and some simulations on just the microcircuit portions without having to store the entire design in working memory, such as DRAM 503. It will be appreciated that DRAM 503 is just one example of the type of memory that can be used for main or working memory and that other types of memory can also be used for main or working memory. Moreover, because each microcircuit can be treated and processed separately, several processors can operate separately and in parallel on each microcircuit portion to provide enhanced parallel processing of the various microcircuit portions. This also can improve computational efficiency in performing the simulations. Another optimization which can be used in certain embodiments can perform convergence testing on candidate pins at the corners and optionally center of a microcircuit region. When the region is enlarged, this processing can be repeated at the edge or periphery of the region.

Figure 4B:
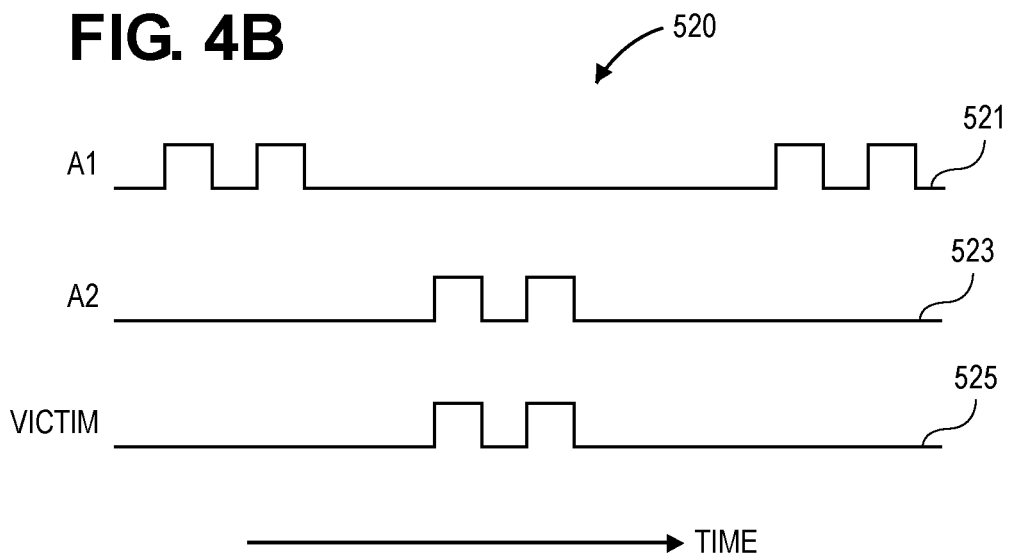
FIG. 4B shows an example of a timing diagram of three different signals that can be used when simulating dynamic voltage drops in a design.

FIG. 4B shows another optimization which can be performed with the one or more embodiments described herein. For example, the simulations or other analyses performed in operation 311 of FIG. 1A and in operation 412 in FIG. 2A can utilize timing information about the victim relative to timing information about the set of aggressors within a region or microcircuit containing the victim. For example, if certain aggressors in a region containing a victim do not switch at the same time as the victim, then those aggressors can be ignored in one embodiment when performing the dynamic voltage drop simulations for the victim. In other words, the simulation of the dynamic voltage drop of the particular victim is performed using aggressors that switch at the same time or nearly the same time as the victim and the simulations ignore the effect of local aggressors within the region of the victim that do not switch at the same time (or nearly the same time) as the victim. This is shown in the switching waveforms 520 of FIG. 4B. Aggressor A1 is shown over time as signal 521. Aggressor A2 is shown over time as signal 523. The victim is shown as having the signal 525, and it can be seen that the victim switches at the same time or nearly the same time as the aggressor A2 while the aggressor A1 does not switch at the same time as the victim. Thus, the simulation of the dynamic voltage drop within a region of the victim containing both aggressors A1 and A2 can use switching for just A2 and not A1 thereby ignoring A1 because it is not likely to affect the victim.

Figure 5A:
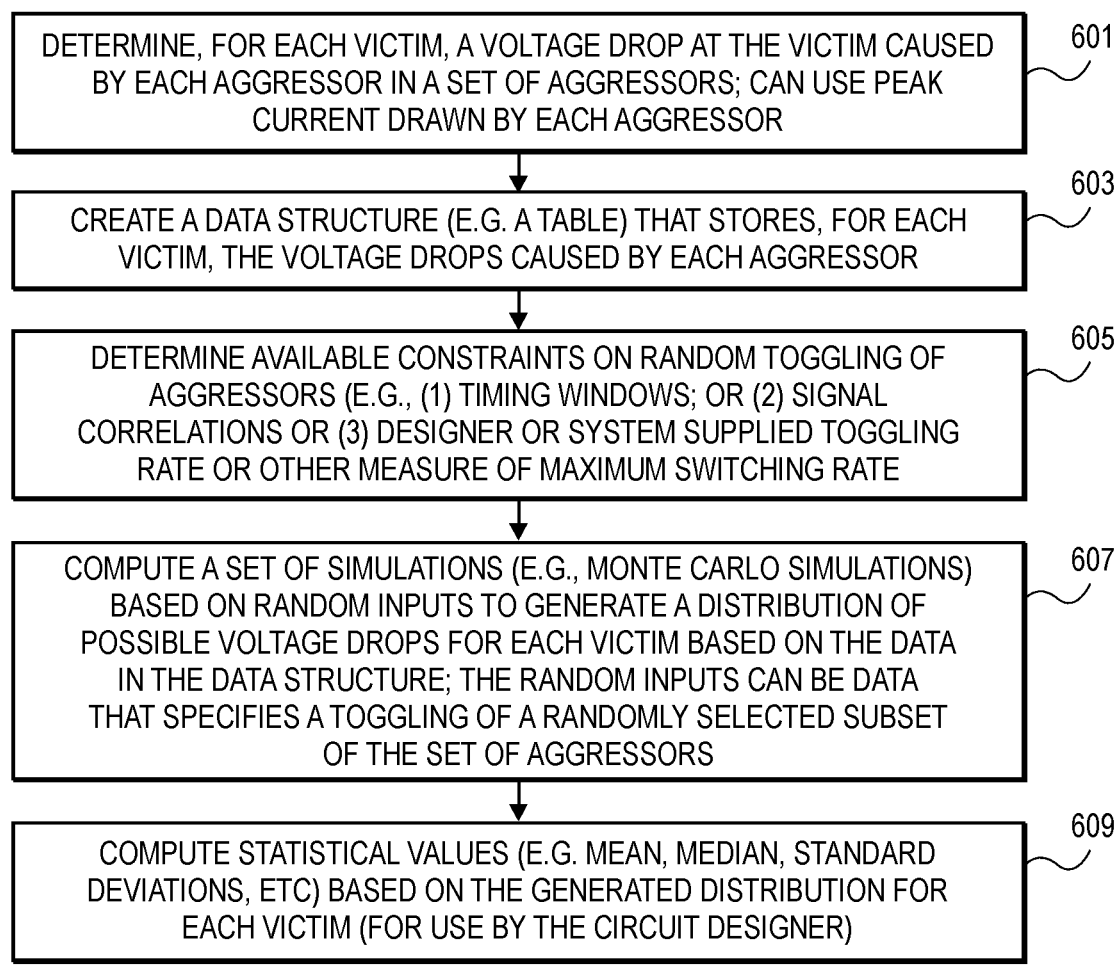
FIG. 5A shows a flowchart which illustrates a method according to an aspect which uses a data structure and simulations to derive distributions of voltage drops for a victim.

Another aspect of this disclosure relates to the use of data structures containing dynamic voltage drop information to derive distributions of voltage drops for a set of victims in a design of an electrical circuit. This aspect in one embodiment can also use the aspect of microcircuits described above. FIG. 5A shows an example of the aspect that uses data structures to derive distributions of voltage drops for a set of victims in the design.

In operation 601 of FIG. 5A, a system can determine, for each victim, a voltage drop at the victim caused by each aggressor in a set of aggressors. In one embodiment, the determination of the voltage drop at the victim can use a peak current drawn by each aggressor, which peak current can be available from information about the design such as, for example, data from an Apache Power Library format or CCS Power or a direct SPICE simulation of the switching event of an aggressor. Operation 601 generates, for each victim, a plurality of voltage drops caused by each aggressor in the set of aggressors, and this voltage drop data can be stored in a data structure, such as a table, in operation 603. The table can store, for each victim, the voltage drops caused by each aggressor, and these voltage drops can be based upon the peak current drawn by each aggressor in one embodiment and can be sorted by their impact on their victim. FIG. 10C in U.S. patent application Ser. No. 16/723, 852 (filed Dec. 20, 2019) shows an example of such a table. In operation 605, the system can determine whether there are any available constraints which can constrain the random toggling of aggressors, which random toggling can occur in a set of simulations such as Monte Carlo simulations to be described further below. In one embodiment, these constraints can include one or more of: (1) timing windows or other timing relationships between switching times of each victim and switching times of each aggressor in the set of aggressors; see, for example, FIG. 4B and the description associated with FIG. 4B; (2) identified groups having signal correlations; see for example the methods described with reference to FIGS. 3 and 4 above; or (3) data such as an input from a designer or a system that specifies a toggling rate or maximum switching rate or desired toggling rate for the design. These constraints can be used to filter the simulations to provide more realistic results by limiting the subset of aggressors that are randomly selected during each simulation in the set of simulations to be described further below. In operation 607, the system can compute a set of simulations, such as a Monte Carlo simulation, based upon random inputs to generate a distribution of possible voltage drops for each victim based on the data in the table or other data structure. The random inputs can be data that specifies a toggling of a randomly selected subset of the set of aggressors in each simulation, wherein the randomly selected subset varies randomly across the set of simulations to generate the distribution of possible voltage drops for each victim. The simulations performed in operation 607 can randomly generate a subset of the set of aggressors which toggle in any given simulation. Thus one random input can specify that about 20% of the set of aggressors switch in one simulation while another random input for another simulation can specify that about 40% of the set of aggressors switch. In both cases, the percentage can be limited to be less than a specified maximum switching percentage or other designer or system supplied toggling rate if available. Moreover, the random subset can be constrained to exclude aggressors that do not switch at the same time as the victim, and the random subset can be constrained to take into account signal correlations as described above (see, for example, the methods described with reference to FIGS. 3 and 4). The data from the simulations performed in operation 607 can be used in operation 609 to compute statistical values. In one embodiment, these statistical values can include mean data, median data, and standard deviation data which are based upon the generated distributions for each victim. These statistical values can be used by the circuit design to evaluate the need for possible modifications to the circuit design, such as the logic elements or other instances in the design as well as possible modifications to the power delivery network.

FIG. 5B shows another method, which is similar to the method shown in FIG. 5A, except the method shown in FIG. 5B can make use of the microcircuit aspect described herein. In operation 631, the system can receive or generate a physical level description of an electrical circuit. The physical level description provides substantial data about components in the circuit which allows calculations of resistances along paths in the power delivery network and calculations of current flows within transistors in the design. Then in operation 633, the system can generate from the description a power delivery network RLC model and then construct a simplified power delivery network RLC ("microcircuit") for each victim; in one embodiment, operation 633 can use the method shown in FIG. 2A or can use the method shown in FIG. 1A to create the simplified power delivery network RLC. In operation 635, the system can use the microcircuit for each victim to identify all cells or instances in the victim that, if they switch, can cause the power supply to the victim to drop more than a predetermined threshold, such as, for example one millivolt, and this collection can be deemed the set of aggressors for that victim. In one embodiment, operation 635 represents the use of the microcircuit or region to identify the sufficient set of aggressors that can be deemed to have a material impact on the victim. Then in operation 637, the system can use each aggressor's peak current and the effective resistance along the power delivery network from the aggressor to the victim to compute the dynamic voltage drop caused by that aggressor. This can be performed for each victim relative to its set of aggressors for that victim, and the results of these computations can be used to create a table or other data structure mapping each aggressor's voltage drop contribution to its victim.

Incremental DVD simulations are another aspect of the embodiments described herein. Incremental DVD simulations can be very useful when a circuit designer is iteratively evaluating a design in a process that includes making changes to the design and then evaluating a power grid's performance after each change in the design. A designer can select portions of the design for evaluation by selecting certain nodes as victims (for example, a node powering a critical gate or logic instance in a portion of the design) and then constructing an appropriate set of local aggressors around each selected victim using the methods described above. Then the designer can use the constructed set of aggressors to perform DVD simulations for only each constructed set of aggressors rather than the entire design. The use of DVD simulations for only one or more portions of the design rather than the entire design can be referred to as an incremental DVD simulation. A conventional DVD simulation consumes huge amounts of memory and compute resources as it requires solving a linear matrix with many billions of notes. This matrix needs to be solved for each time step, and each solution has to produce a consistent solution for all the notes. As each new generation of designs gets larger and larger, this causes increasing memory usage that tend to go beyond what most customers can tolerate. Further, as designs grow larger, so does the number of vectors that must be simulated to explore the behavior of the design to ascertain no undesired conditions such as a voltage drop at a node dropping below a design architecture specified limit.

Figure 6A:
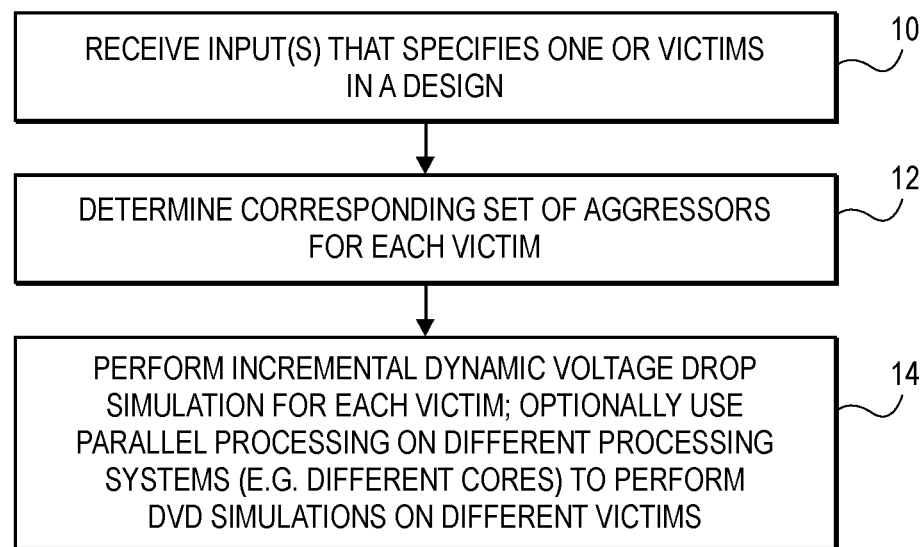
FIG. 6A is a flowchart that shows a method according to an embodiment that uses one or more incremental simulations.

FIG. 6A shows an example of a method that can use one or more incremental simulations according to one embodiment. In operation 10, a data processing system (which can include simulation software) can receive one or more inputs that specify one or more victims in a design. For example, in the case shown in FIG. 6B, the design 17 has three victims 19, 23, and 27 which have been selected by a designer of the design 17. These particular victims may be power supply notes that supply power to critical gates in a portion of the design known by the designer. Then in operation 12 of FIG. 6A, the data processing system can determine a corresponding set of aggressors for each victim using the techniques described above. In one embodiment, the data processing system can look at the peak switching currents drawn by those aggressors and multiply the peak current by the impedance to the victim to obtain a measure of the impact of that aggressor upon the victim. The data processing system can then sort all aggressors for each victim by their impact and preserve the top N aggressors, were N can either be a fixed number chosen by the user or a number that is automatically derived based upon desired accuracy level selected by the user or desired capacity level (such as memory capacity of the system) also set by the user.

Figure 6B:
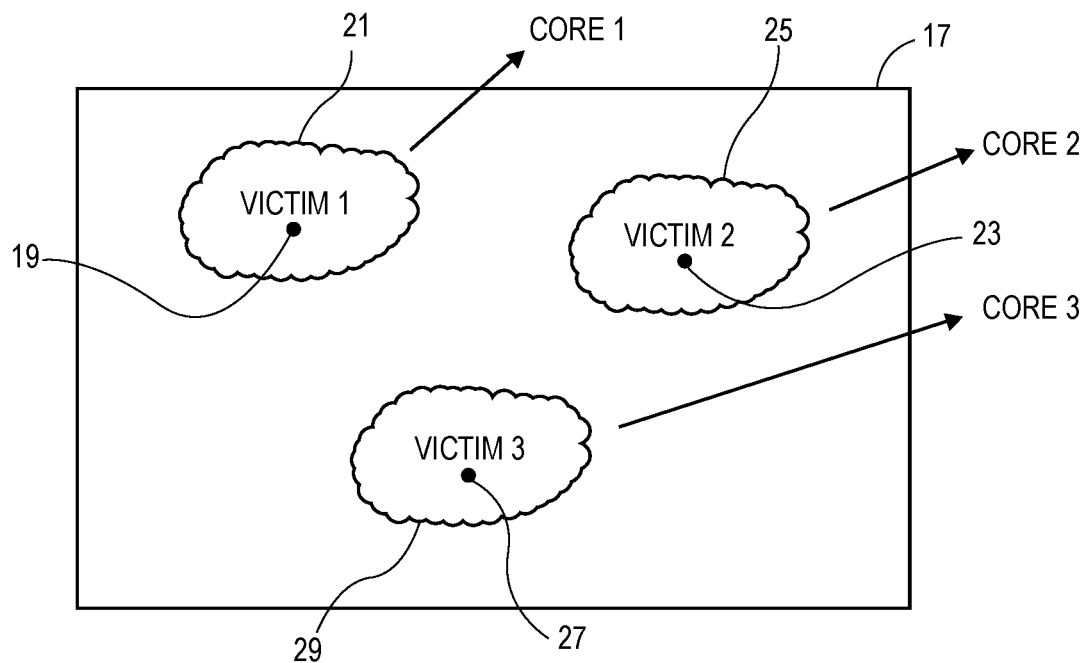
FIG. 6B shows an example of the use of the method in FIG. 6A on a design after 3 victims have been selected.

Then in operation 14, the data processing system can perform incremental dynamic voltage drop simulations for each victim. In one embodiment, each of these simulations can be performed independently based on the set of aggressors. As shown in FIG. 6B, the set of aggressors 21 are distinct and separate from the set of aggressors 25 and 29. The set of aggressors 21 was identified in operation 12 of FIG. 6A using the techniques described above to select the set of aggressors for the victim 19. The set of aggressors 25 was determined in operation 12 using the techniques described above to select the appropriate set of aggressors for the victim 23. Similarly, the set of aggressors 29 was selected in operation 12 using the techniques described above to select the appropriate set of aggressors for the victim 27. In one embodiment of the method shown in FIG. 6A, operation 14 can use separate processing devices or systems (such as different cores) to perform the simulations on the different victims. For example, in one embodiment the DVD simulations for the set of aggressors 21 shown in FIG. 6B can be processed on a first core ("core 1") while DVD simulations of the set of aggressors 25 for the victim 23 can be performed on a second core ("core 2") which is different than the first core, and DVD simulations of the set of aggressors 29 for the victim 27 can be performed on another core ("core 3") which is separate and distinct from the first and second cores shown in FIG. 6B. Thus, the incremental dynamic voltage drop simulations can be performed with parallel processing on distinct processors further improving the computational efficiency of the system and also providing faster results. In operation 14, a data processing system can iterate over all of the N aggressors for each victim, where this iteration is along a time axis for all switching events for the aggressors in the list of and aggressors. At each time step, the current drawn by each aggressor (in the set of aggressors) is multiplied by the impedance to the victim to obtain the aggressor's voltage impact on the victim at that time step. At each time step, the sum of all aggressor's voltage impacts on the victim is the victim's simulated voltage drop, and the time series of these sums is a dynamic voltage drop simulation result at the victim. Because the system being solved is linear, each event can be simulated one at a time and then added up. The majority of the voltage drop on the victim can be captured by the set of its aggressors as opposed to the entire design as the impedance to the aggressors grows quickly with distance in most designs due to the physical constraints on the behavior and design of semiconductor power delivery networks. Just keeping the dominant N aggressors results in an accurate approximation with a significantly lower memory and compute cost.

Figure 7A:
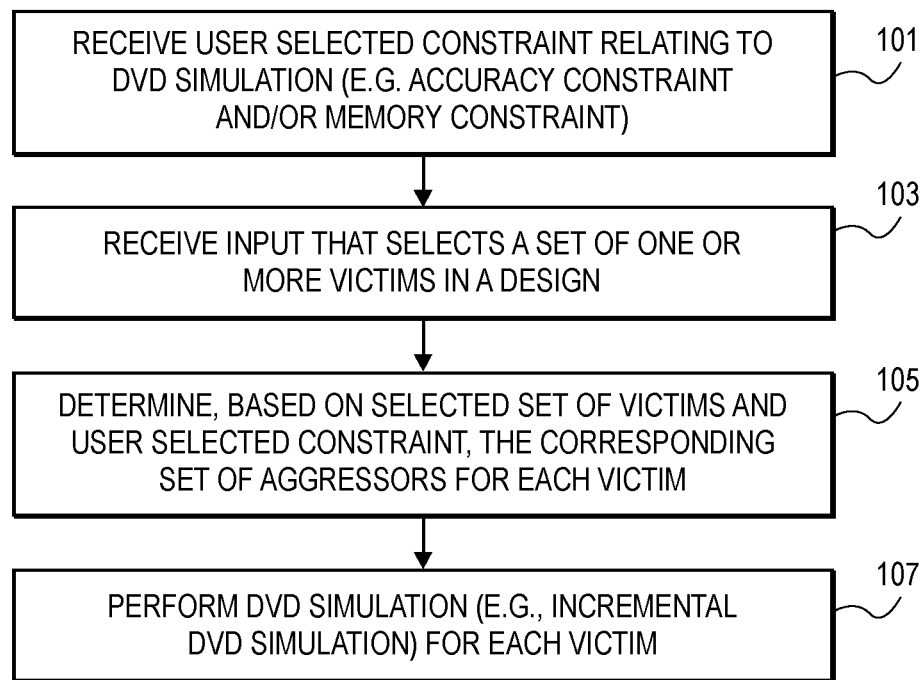
FIG. 7A is a flowchart that shows a method according to an embodiment that uses one or more user specified constraints with one or more simulations.

Another aspect of the embodiments described herein can use user selected constraints to adjust the number of aggressors or the size of the region around the victim. In particular, a user selected constraint can select a level of accuracy or performance or memory capacity. For example, if the user is concerned about accuracy the user can increase the number of aggressors around the victim by increasing N (which can be the top N aggressors in a sorted list of aggressors in one embodiment). If the user desires more accuracy, than more aggressors can be selected by making N a larger number; a larger N can be achieved by adjusting the predetermined voltage or a predetermined precision threshold used in operation 409 shown in FIG. 2A when the method of constructing the set of aggressors is being performed. In other words, these thresholds can be adjusted in response to user input which indicates a desired level of accuracy or desired level of memory usage. For example, a higher level of accuracy will dictate as smaller predetermined threshold. FIG. 7A shows a method which can use one or more user selected constraints to control one or more DVD simulations. In operation 101, the data processing system can receive one or more user selected constraints relating to the simulation. The constraint can be a user selected level of accuracy or a user selected level of memory usage. For example, in one embodiment the data processing system may give the user a set of choices such as more accuracy, average accuracy, and less accuracy, where more accuracy is more accuracy than the average accuracy and less accuracy is less accuracy than the average accuracy. In one embodiment, each level of accuracy will have different values for N. In another embodiment, the system may give the user the ability to select between different levels of memory usage and this will accordingly adjust the number of aggressors (e.g., N) which are retained for each victim. In operation 103, the system can receive one or more inputs that select a set of one or more victims in the design. It will be appreciated that the order of operations 101 and 103 may be reversed in certain embodiments. In operation 105, the data processing system determines, based on the selected set of victims (from operation 103) and the user selected constraint (from operation 101) the corresponding set of aggressors for each victim. As described above, the set of aggressors for each victim can be sorted in a list by the impact on the voltage drop of each victim. The largest impacts will be retained such as the largest N impacts from N aggressors. The number N can be determined at least in part by the user selected constraint as described herein. For example, the user selected setting or constraint of more accuracy or the highest accuracy will cause N to be large relative to the other choices such as average accuracy or less accuracy. An example of how these selections can vary the size of the set of aggressors will be provided below in conjunction with FIG. 7B. In operation 107 of FIG. 7A, the system can then perform one or more DVD simulations for each victim. In one embodiment, the DVD simulations can be a full simulation of the entire design; in another embodiment, the DVD simulation can be an incremental DVD simulation for each victim. In one embodiment, the data processing system can provide feedback on memory usage as the accuracy level is adjusted in real time. For example, the user may select one accuracy level and see the amount of memory usage and decide that too much memory is being used and reduce the accuracy level.

Figure 7B:
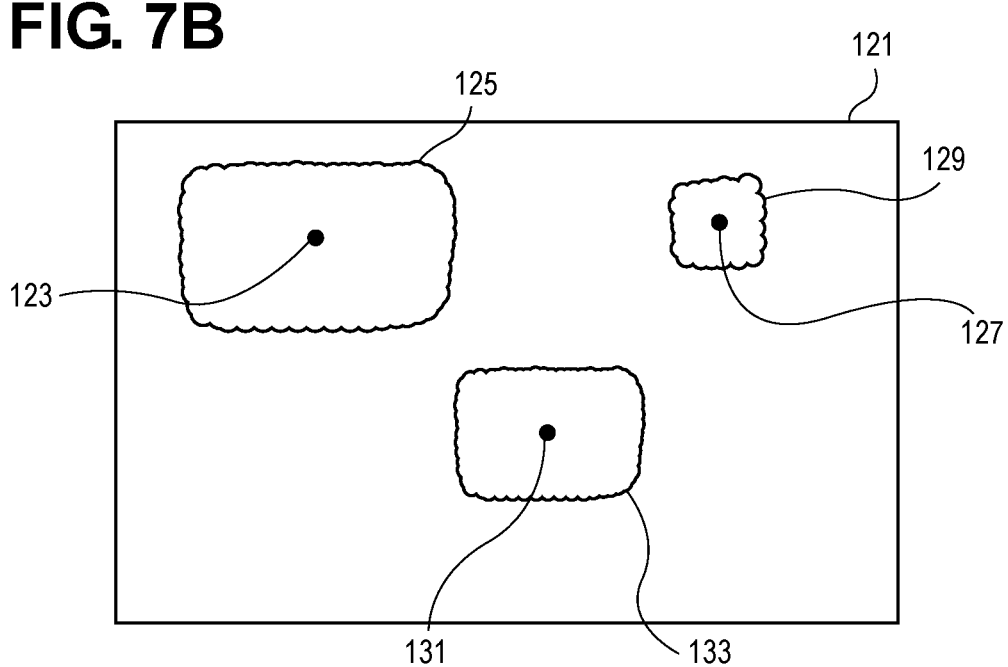
FIG. 7B shows an example of the use of the method in FIG. 7A on a design after one or more user specified constraints have been used to construct microcircuits around selected victims.

In the example shown in FIG. 7B, a designer has selected three different levels of accuracy for the DVD simulations of 3 different portions of the design 121. In particular, for the victim 123, the designer has selected the highest level of accuracy which results in the largest set of aggressors as shown in FIG. 7B. The size of the region of the aggressors 125 is much larger than the size of the aggressors 129 and the size of the aggressors 133. In this example, the value of N for the set of aggressors 125 is much larger than the value of N for the set of aggressors 133 and the set of aggressors 129. In the case of the victim 131, the designer has selected an average accuracy level producing a medium-size set of aggressors 133. In the case of the aggressors 129, the designer has selected a low accuracy level which can save memory; perhaps the designer needed to save memory due to the large size of the aggressors 125. The data processing system can in one embodiment provide feedback on memory usage as the designer adjusts the accuracy level so that the designer can ensure that the simulation will run with adequate speed even when virtual memory is available.

Figure 8:
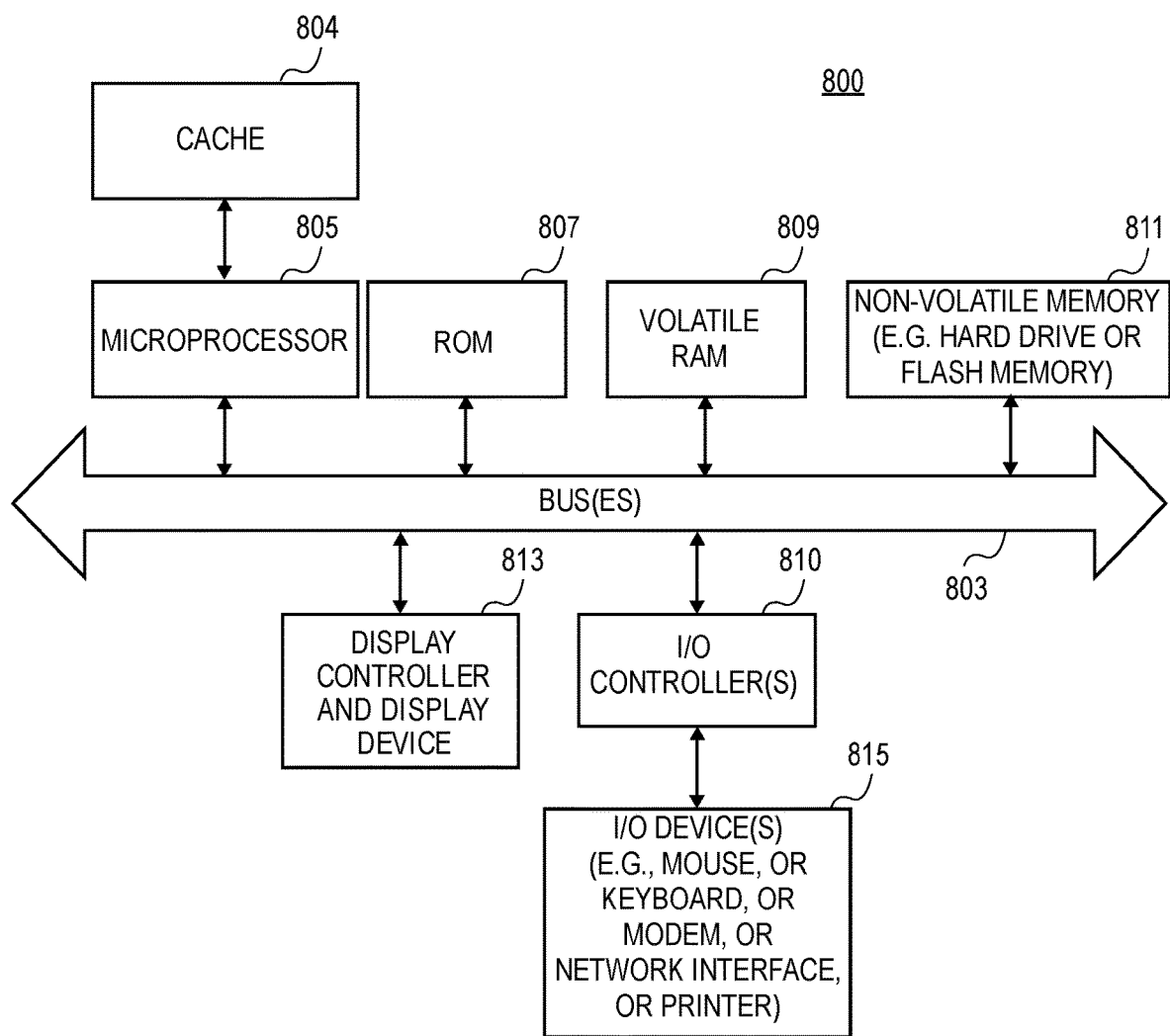
FIG. 8 shows an example of a data processing system that can be used to implement one or more of the embodiments described herein.

FIG. 8 shows one example of a data processing system 800, which may be used with one embodiment. For example, the system 800 may be implemented to provide a system or device that performs any one of the methods described herein. Note that while FIG. 8 illustrates various components of a device, it is not intended to represent any particular architecture or manner of interconnecting the components as such details are not germane to the disclosure. It will also be appreciated that network computers and other data processing systems or other consumer electronic devices, which have fewer components or perhaps more components, may also be used with embodiments of the disclosure.

As shown in FIG. 8, the device 800, which is a form of a data processing system, includes a bus 803 which is coupled to a microprocessor(s) 805 and a ROM (Read Only Memory) 807 and volatile RAM 809 and a non-volatile memory 811. The microprocessor(s) 805 may retrieve the instructions from the memories 807, 809, 811 and execute the instructions to perform operations described above. The microprocessor(s) 805 may contain one or more processing cores. The bus 803 interconnects these various components together and also interconnects these components 805, 807, 809, and 811 to a display controller and display device 813 and to peripheral devices such as input/output (I/O) devices 815 which may be touchscreens, mice, keyboards, modems, network interfaces, printers and other devices which are well known in the art. Typically, the input/output devices 815 are coupled to the system through input/output controllers 810. The volatile RAM (Random Access Memory) 809 is typically implemented as dynamic RAM (DRAM), which requires power continually in order to refresh or maintain the data in the memory.

The non-volatile memory 811 is typically a magnetic hard drive or a magnetic optical drive or an optical drive or a DVD RAM or a flash memory or other types of memory systems, which maintain data (e.g., large amounts of data) even after power is removed from the system. Typically, the non-volatile memory 811 will also be a random access memory although this is not required. While FIG. 8 shows that the non-volatile memory 811 is a local device coupled directly to the rest of the components in the data processing system, it will be appreciated that embodiments of the disclosure may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The disclosure also relates to an apparatus for performing the operations described herein. This apparatus may be specially constructed for the required purpose, or it may comprise a general-purpose device selectively activated or reconfigured by a computer program stored in the device. Such a computer program may be stored in a non-transitory computer readable storage medium, such as, but not limited to, any type of disk including floppy disks, optical disks, CD-ROMs, and magnetic-optical disks, DRAM (volatile), flash memory, read-only memories (ROMs), RAMs, EPROMs, EEPROMs, magnetic or optical cards, or any type of media suitable for storing electronic instructions, and each coupled to a device bus.

A machine readable medium includes any mechanism for storing information in a form readable by a machine (e.g., a computer). For example, a non-transitory machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more non-transitory memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)) and then stored in non-transitory memory (e.g., DRAM or flash memory or both) in the client computer.

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A machine readable medium storing executable program instructions which when executed by a data processing system cause the data processing system to perform a method, the method comprising:
    receiving one or more inputs that specify a selected set of victims in a design of an electrical circuit;
    determining a corresponding set of aggressors for each victim based on the selected set of victims;
    performing an incremental dynamic voltage drop simulation for each victim in the set of victims based on the determined set of aggressors, wherein the incremental voltage drop simulation is limited to a portion of the design that includes the selected set of victims and the corresponding set of aggressors, and wherein each corresponding set of aggressors represent a set of instances in a design that cause a voltage drop on a power supply node of the victim of the corresponding set of aggressors when they switch states.

2. The medium as in claim 1, wherein the incremental voltage drop simulation computes a set of vector multiply and accumulate operations limited to the selected set of aggressors around the corresponding victim without computing vector multiply and accumulate operations for instances not included in the selected set of aggressors and wherein the incremental voltage drop simulation seeks to determine effects on a power grid from an incremental change in the design.

3. The medium as in claim 2, wherein the method further comprises:
    determining whether the determined corresponding set of aggressors for each victim captures a sufficient set of aggressors that cause a voltage drop at the power supply node of the corresponding victim.

4. The medium as in claim 3, wherein the method further comprises:
    enlarging a first region containing a first set of aggressors to create a second region containing a second set of aggressors in response to determining the first region does not capture a sufficient set of aggressors, the second region being a portion of the design and encompassing the first set of aggressors.

5. The medium as in claim 2, wherein each set of vector multiply and accumulate operations is performed on a separate processing core.

6. The medium as in claim 5 wherein the set of vector multiply and accumulate operations are performed concurrently in time.

7. The medium as in claim 5, wherein the set of vector multiple and accumulate operations for one victim and another set of vector multiple and accumulate operations for another victim are independent operations that do not depend on each other.

8. The medium as in claim 3, wherein a sufficient set of aggressors is captured when voltage drops at the corresponding victim caused by logic elements at a periphery converge to values less than a predetermined electrical value which can be one of a voltage value or a current value.

9. The medium as in claim 2, wherein the method further comprises:
receiving one or more user selected constraints associated with the selected set of victims, wherein the one or more user selected constraints comprise one of: (a) an accuracy constraint that specifies a level of desired accuracy in the incremental dynamic voltage drop simulation or (b) a memory constraint that limits computations based on an amount of available memory in the data processing system.

10. A machine readable medium storing executable program instructions which when executed by a data processing system cause the data processing system to perform a method, the method comprising:
receiving one or more inputs that specify a selected set of victims in a design of an electrical circuit;
receiving one or more user selected constraints associated with the selected set of victims;
determining a corresponding set of aggressors for each victim based on the selected set of victims and the user selected constraints;
performing a dynamic voltage drop simulation for each victim in the set of victims based on the determined set of aggressors and the user selected constraints, wherein the dynamic voltage drop simulation is an incremental voltage drop simulation and the one or more user selected constraints comprise one of: (a) an accuracy constraint that specifies a level of desired accuracy in the incremental dynamic voltage drop simulation or (b) a memory constraint that limits computations based on an amount of available memory in the data processing system.

11. The medium as in claim 10, wherein a high level of accuracy in a specified user selected constraint causes a larger set of aggressors than a low level of accuracy in the specified user selected constraint.

12. The medium as in claim 11, wherein the high level of accuracy will use more memory in the data processing system during the DVD simulation than the low level of accuracy.

13. The medium as in claim 10, wherein the incremental voltage drop simulation is limited to a portion of the design that includes the selected set of victims and the corresponding set of aggressors, and wherein each corresponding set of aggressors represent a set of instances in a design that cause a voltage drop on a power supply node of the victim of the corresponding set of aggressors when they switch states.

14. The medium as in claim 13, wherein a high level of accuracy in a specified user selected constraint causes a larger set of aggressors than a low level of accuracy in the specified user selected constraint.

15. The medium as in claim 14, wherein the high level of accuracy will use more memory in the data processing system during the DVD simulation than the low level of accuracy.

16. The medium as in claim 13, wherein the incremental voltage drop simulation computes a set of vector multiply and accumulate operations limited to the selected set of aggressors around the corresponding victim without computing vector multiply and accumulate operations for instances not included in the selected set of aggressors and wherein the incremental voltage drop simulation seeks to determine effects on a power grid from an incremental change in the design.

\* \* \* \* \*